(12) United States Patent
Murakami et al.

(10) Patent No.: US 9,770,777 B2
(45) Date of Patent: Sep. 26, 2017

(54) ARC WELDING APPARATUS, ARC WELDING METHOD, ARC WELDING SYSTEM, AND WELDED ARTICLE

(71) Applicant: KABUSHIKI KAISHA YASKAWA DENKI, Kitakyushu-shi (JP)

(72) Inventors: Masafumi Murakami, Kitakyushu (JP); Taichi Sakamoto, Kitakyushi (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 246 days.

(21) Appl. No.: 14/489,491

(22) Filed: Sep. 18, 2014

(65) Prior Publication Data
US 2015/0076132 A1   Mar. 19, 2015

(30) Foreign Application Priority Data

Sep. 19, 2013  (JP) ................................ 2013-194109

(51) Int. Cl.
*B23K 9/10*    (2006.01)
*B23K 9/28*    (2006.01)
(Continued)

(52) U.S. Cl.
CPC .............. *B23K 9/125* (2013.01); *B23K 9/091* (2013.01); *B23K 9/095* (2013.01); *B23K 9/173* (2013.01)

(58) Field of Classification Search
CPC ...... B23K 9/06–9/0678; B23K 9/073–9/0738; B23K 9/091; B23K 9/095; B23K 9/124–9/126; B23K 9/173
(Continued)

(56) References Cited

U.S. PATENT DOCUMENTS 7,960,672 B2 * 6/2011 Nishimura ........... B23K 9/0671
                                                      219/125.1
9,050,677 B2 * 6/2015 Kawamoto ............ B23K 9/067
                                                      219/137.71
(Continued)

FOREIGN PATENT DOCUMENTS

AU    2010200365    2/2010
JP    2008-542027   11/2008
(Continued)

OTHER PUBLICATIONS

Chinese Office Action for corresponding CN Application No. 201410377314.3, dated Feb. 22, 2016.
(Continued)

*Primary Examiner* — Sang Y Paik
(74) *Attorney, Agent, or Firm* — Mori & Ward, LLP

(57) ABSTRACT

An arc welding apparatus includes: a detector configured to detect whether it is in a short state or an arc state between a consumable electrode and a welded article; a feed adjuster configured to apply a forward feed for feeding the consumable electrode when the arc state is detected and apply a reverse feed for feeding the consumable electrode when the short state is detected; a determiner configured to determine whether or not a predetermined period has elapsed after the detector has detected the short state; and an instructor configured to instruct the feed adjuster to continue the reverse feed even when the arc state is detected, until the determiner determines that the predetermined period has elapsed.

26 Claims, 6 Drawing Sheets

(51) Int. Cl.
  *B23K 9/12* (2006.01)
  *B23K 9/09* (2006.01)
  *B23K 9/095* (2006.01)
  *B23K 9/173* (2006.01)

(58) Field of Classification Search
  USPC .................. 219/136–137 PS, 137.2, 137.21, 219/137.7–137.71
  See application file for complete search history.

(56) References Cited

U.S. PATENT DOCUMENTS

| | | | |
|---|---|---|---|
| 2006/0138115 A1* | 6/2006 | Norrish | B23K 9/09 219/137.71 |
| 2009/0026188 A1 | 1/2009 | Schorghuber | |
| 2012/0074114 A1 | 3/2012 | Kawamoto et al. | |
| 2013/0299476 A1 | 11/2013 | Fujiwara et al. | |

FOREIGN PATENT DOCUMENTS

| | | |
|---|---|---|
| JP | 4807474 B2 | 11/2011 |
| JP | 2012-091222 | 5/2012 |
| WO | WO 00/64620 | 11/2000 |
| WO | WO 2013/008394 | 1/2013 |

OTHER PUBLICATIONS

The influence brought individually by C, P, S, Ni and B (i.e., the elements that can cause the solidification crack), Mar. 31, 2008, pp. 78-80, See Cite No. 9.

Japanese Office Action for corresponding JP Application No. 2013-194109, dated Sep. 8, 2015.

Extended European Search Report for corresponding EP Application No. 14184394.6-1702, dated Sep. 18, 2015.

* cited by examiner

ARC WELDING APPARATUS, ARC WELDING METHOD, ARC WELDING SYSTEM, AND WELDED ARTICLE

CROSS-REFERENCE TO RELATED APPLICATION

This application claims priority from Japanese Patent Application No. 2013-194109 filed with the Japan Patent Office on Sep. 19, 2013, the entire content of which is hereby incorporated by reference.

BACKGROUND

1. Technical Field

Disclosed embodiments relate to an arc welding apparatus, an arc welding method, an arc welding system, and a welded article.

2. Related Art

An arc welding apparatus disclosed in Japanese Patent No. 4807474 intends to improve the welding quality by controlling the feeding direction to the welding wire. Feeding the welding wire in the direction to the base metal (the work) is called as "forward feed" and feeding the welding wire in the direction opposite to the base metal is called as "reverse feed". The arc welding apparatus of Japanese Patent No. 4807474 suppresses the increase of the spatter by reverse-feeding the welding wire until a short is opened regardless of the welding frequency.

SUMMARY

An arc welding apparatus includes: a detector configured to detect whether it is in a short state or an arc state between a consumable electrode and a welded article; a feed adjuster configured to adjust a feeding state of the consumable electrode so as to apply a forward feed for feeding the consumable electrode in a direction to the welded article when the detector detects the arc state and apply a reverse feed for feeding the consumable electrode in a direction opposite to the welded article when the detector detects the short state; a determiner configured to determine whether or not a predetermined period has elapsed after the detector has detected the short state; and an instructor configured to instruct the feed adjuster to continue the reverse feed even when the detector detects the arc state, until the determiner determines that the predetermined period has elapsed after the detector has detected the short state.

DETAILED DESCRIPTION

Figure 1:
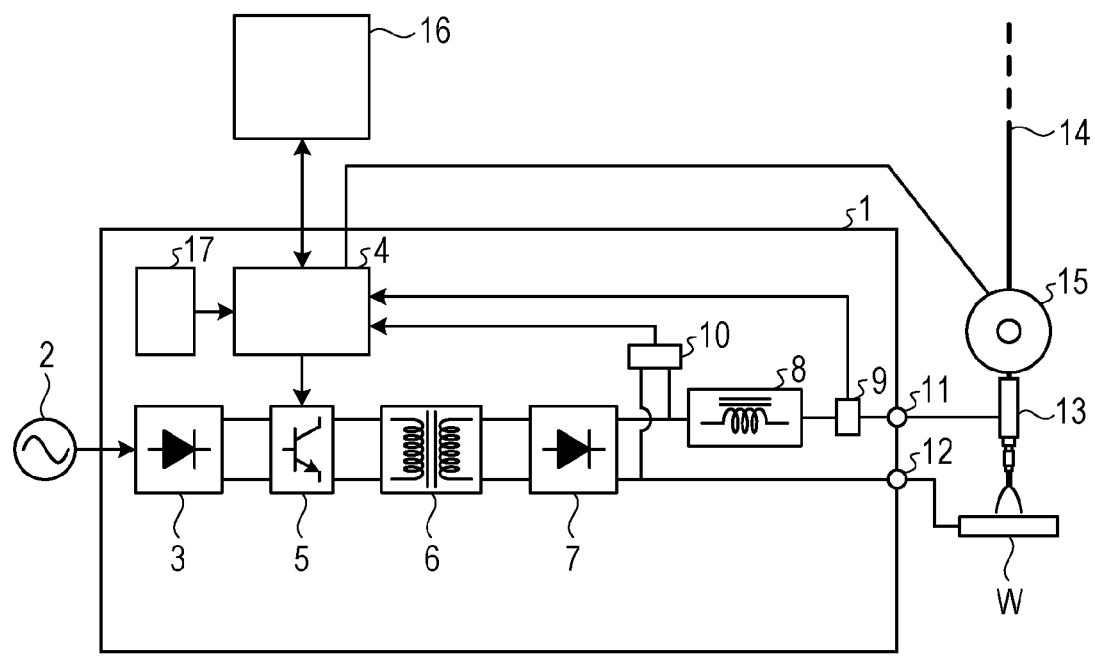
FIG. 1 is a diagram illustrating an arc welding apparatus according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An arc welding apparatus according to one form of the embodiments includes a detector, a feed adjuster, a determiner, and an instructor. The detector detects whether it is in a short state or an arc state between a consumable electrode and a welded article. The feed adjuster adjusts a feeding state of the consumable electrode so as to apply a forward feed for feeding the consumable electrode in a direction to the welded article when the detector detects the arc state and apply a reverse feed for feeding the consumable electrode in a direction opposite to the welded article when the detector detects the short state. The determiner determines whether or not a predetermined period has elapsed after the detector has detected the short state. Until the determiner determines that the predetermined period has elapsed after the detector has detected the short state, the instructor instructs the feed adjuster to continue the reverse feed even when the detector detects the arc state.

According to one form of the embodiments, the welding quality can be improved.

Described below in detail will be embodiments of an arc welding apparatus, an arc welding method, an arc welding system, and a welded article disclosed by the present application with reference to accompanying drawings. It is noted that the following embodiments do not limit the present disclosure.

(First Embodiment)

An arc welding apparatus 1 according to the first embodiment continues the reverse feed until at least a predetermined period has elapsed regardless of whether it is in a short state or an arc state. This allows for the improvement of the welding quality.

FIG. 1 is a diagram illustrating a configuration of the arc welding apparatus 1 according to the first embodiment. The arc welding apparatus 1 has a primary rectifying circuit 3, a welding controller 4, a switching circuit 5, a transformer 6, a secondary rectifying circuit 7, a reactor 8, a current detector 9, a voltage detector 10, and a storage 17. The arc welding apparatus 1 supplies electric power for the welding to a welding torch 13 and a welded article (a work) W.

The primary rectifying circuit 3 is connected to a source power supply 2. Further, the primary rectifying circuit 3 rectifies alternating power supplied from the source power supply 2. Further, the primary rectifying circuit 3 supplies the rectified power to the switching circuit 5.

The switching circuit 5 applies a PWM control to the electric power supplied from the primary rectifying circuit 3 to generate power supply to be supplied to the welding torch 13. Further, the switching circuit 5 outputs the generated power supply to the transformer 6.

The transformer 6 transforms the power supply voltage. Further, the transformer 6 outputs the transformed power supply to the secondary rectifying circuit 7. The secondary rectifying circuit 7 rectifies the power supply outputted from the transformer 6. Further, the secondary rectifying circuit 7 is connected to the work W via an output terminal 12.

The reactor 8 smoothes the power supply rectified by the secondary rectifying circuit 7. Further, the reactor 8 is connected to the welding torch 13 via an output terminal 11. The power supply smoothed by the reactor 8 is supplied to the welding torch 13 and the work W via the output terminals 11 and 12.

The current detector 9 detects the current between the welding torch 13 and the work W (hereafter, referred to as "welding current"). Further, the current detector 9 outputs the detected result to the welding controller 4. The voltage detector 10 detects the voltage between the welding torch 13 and the work W (hereafter, referred to as "welding voltage"). Further, the voltage detector 10 outputs the detected result to the welding controller 4.

The welding controller 4 controls the switching circuit 5 and a feeding device 15 based on the detected result inputted from the current detector 9 and the voltage detector 10 and the instruction inputted from an external controller 16. Further, the welding controller 4 outputs information regarding the welding such as the welding current, the welding voltage, and the like to the external controller 16. The details of the welding controller 4 will be described later.

The welding torch 13 supplies the welding current to a welding wire (a consumable electrode) 14. The feeding device 15 has an actuator such as a servo motor, for example. Further, the feeding device 15 applies a forward feed and a reverse feed of the welding wire 14 based on the instruction from the welding controller 4. Here, the forward feed refers to the feeding of the welding wire 14 in the direction to the work W. The reverse feed refers to the feeding of the welding wire 14 in the direction opposite to the work W.

The external controller 16 has a user interface (not shown) such as a keyboard, a touch panel, or the like and/or a display (not shown) such as a liquid crystal panel or the like. Further the external controller 16 accepts the input of the welding condition via the user interface. Here, the welding condition may include, for example, the welding current value, the welding voltage value, and the feeding speed of the welding wire 14.

Further, the external controller 16 outputs the inputted welding condition to the welding controller 4. Further, the external controller 16 displays the information regarding the welding inputted from the welding controller 4 on the display.

The storage 17 is, for example, a nonvolatile memory and stores control patterns, parameters, and the like of the feeding of the welding wire 14, the welding current, and the welding voltage.

Figure 2:
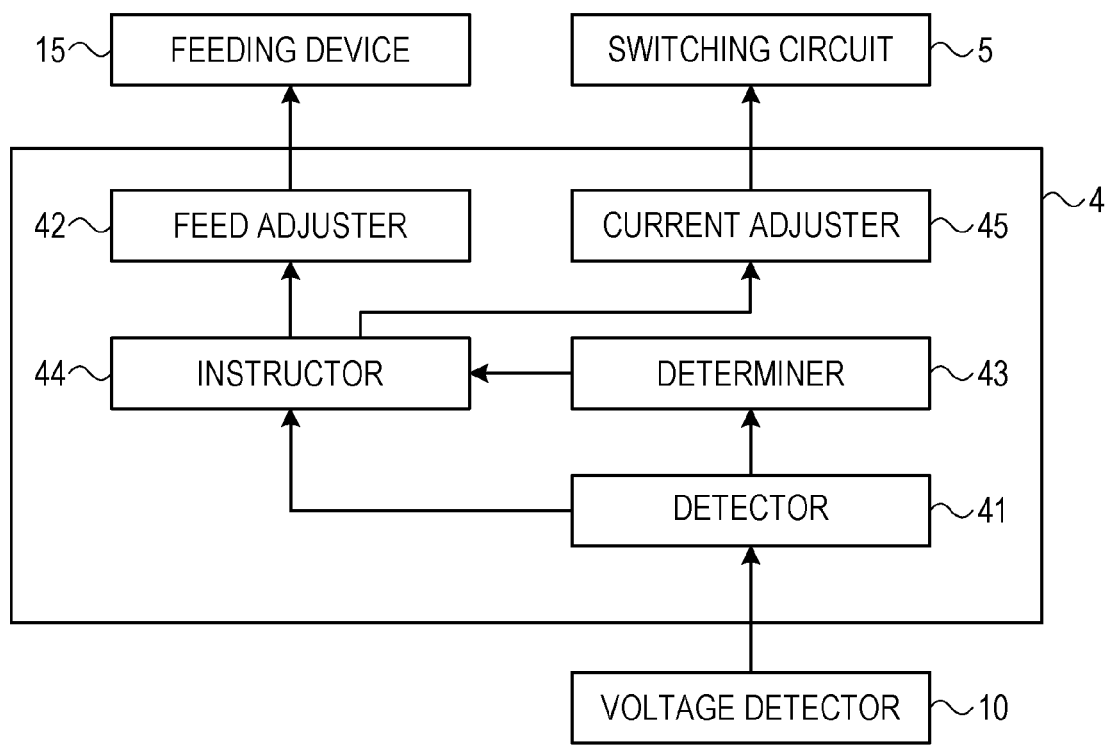
FIG. 2 is a diagram illustrating a welding controller according to the first embodiment.

Next, FIG. 2 is a block diagram illustrating the configuration of the welding controller 4. The welding controller 4 has a detector 41, a feed adjuster 42, a determiner 43, an instructor 44, and a current adjuster 45.

The detector 41 detects whether it is in a short state or an arc state between the welding wire 14 and the work W. Further, when the voltage value detected by the voltage detector 10 is less than or equal to a predetermined value, the detector 41 detects (determines) that it is in the short state between the welding wire 14 and the work W (that is, at this time, the detector 41 detects the short state). On the other hand, when the voltage value detected by the voltage detector 10 is greater than the predetermined value, the detector 41 detects (determines) that it is in the arc state between the welding wire 14 and the work W (that is, at this time, the detector 41 detects the arc state). Further, the detector 41 outputs the detected result to the determiner 43 and the instructor 44.

The feed adjuster 42 adjusts the feeding state of the welding wire 14 so that the welding wire 14 is forward-fed when the detector 41 detects the arc state and the welding wire 14 is reverse-fed when the detector 41 detects the short state. Further, the feed adjuster 42 controls the feeding device 15 to apply the forward feed and the reverse feed of the welding wire 14 based on the instruction from the instructor 44.

The determiner 43 determines whether or not a predetermined period has elapsed after the detector 41 has detected the short state. It is noted that the determiner 43 has a timer. Upon receiving the notification from the detector 41 indicating that the short state has been detected, the determiner 43 starts timing. Further, when a predetermined period has elapsed after starting the timing, the determiner 43 notifies it to the instructor 44.

The instructor 44 instructs the feed adjuster 42 to adjust the feeding state of the welding wire 14 based on the detected result of the detector 41. Specifically, when the detector 41 detects the arc state, the instructor 44 instructs the feed adjuster 42 to forward-feed the welding wire 14. When the detector 41 detects the short state, the instructor 44 instructs the feed adjuster 42 to reverse-feed the welding wire 14.

Further, until the determiner 43 determines that the predetermined period has elapsed after the detector 41 has detected the short state, the instructor 44 instructs the feed adjuster 42 to continue the reverse feed even when the detector 41 has detected the arc state.

Further, even when the determiner 43 has determined that the predetermined period has elapsed, the instructor 44 instructs the feed adjuster 42 to continue the reverse feed until the detector 41 detects the arc state.

The instructor 44 notifies the current adjuster 45 of the welding state and the feeding state. Specifically, the instructor 44 notifies the current adjuster 45 of whether the reverse feed is being applied under the short state, the forward feed is being applied under the arc state, or the reverse feed is being applied in spite of the arc state.

The current adjuster 45 adjusts the current value to be supplied to the welding wire 14 according to the notification from the instructor 44. Specifically, the current adjuster 45 generates the current adjustment signal according to the notification from the instructor 44 and the control pattern of the welding current. Further, the current adjuster 45 outputs the current adjustment signal to the switching circuit 5.

After the detector 41 has detected the arc state and until the determiner 43 determines that the predetermined period has elapsed after the detection of the short state, the current adjuster 45 adjusts the switching circuit 5 so that the current value supplied to the welding wire 14 is set smaller than the maximum value of the current that is supplied to the welding wire 14 in the case of the arc state.

Next, the operation of the arc welding apparatus 1 will be described. First, the normal operation of the arc welding apparatus 1 will be described.

Figure 3:
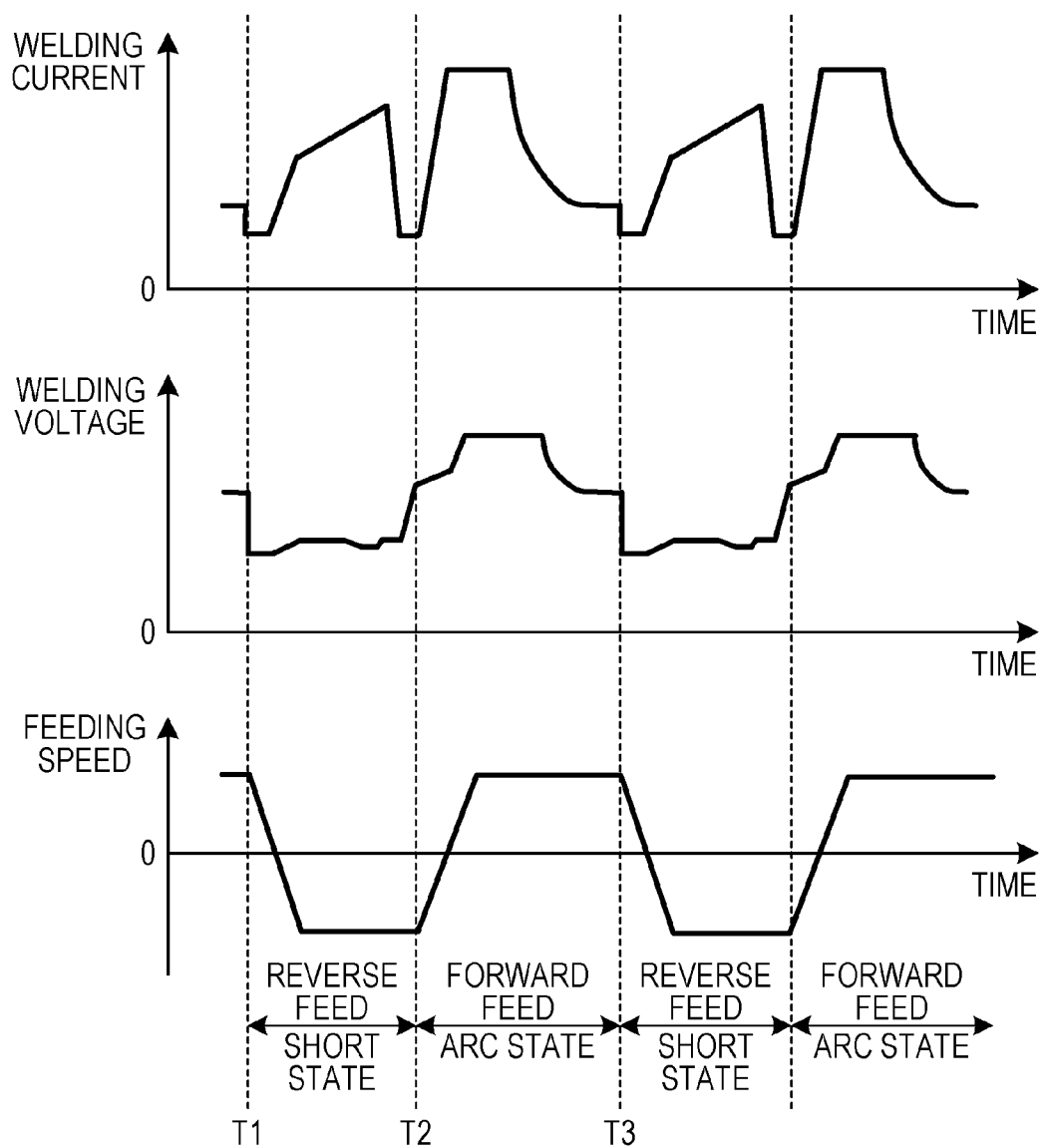
FIG. 3 illustrates graphs representing temporal changes of a welding current, a welding voltage, and a feeding speed according to the first embodiment.

FIG. 3 illustrates graphs representing temporal changes of the welding current, the welding voltage, and the feeding speed of the welding wire 14 according to the present embodiment. The vertical axes of the graphs represent the welding current, the welding voltage, and the feeding speed, respectively. The horizontal axes of the graphs all represent time. It is noted that, in the present embodiment, the graph (the waveform) of the feeding speed has a form of trapezoidal waves as illustrated in FIG. 3. However, not limited to it, the waveform of the feeding speed may be a form of sinusoidal waves, a form of square waves, or a form of triangular waves.

It is assumed that the short state is detected by the arc welding apparatus 1 (the detector 41) at time T1 indicated in FIG. 3. Upon the detection of the short state, the arc welding apparatus 1 (the instructor 44, the feed adjuster 42) controls the feeding device 15 so as to change the feeding state of the welding wire 14 from the forward feed to the reverse feed. Further, the arc welding apparatus 1 (the current adjuster 45, the switching circuit 5) gradually increases the welding current.

In response that the welding wire 14 is reverse-fed, the short is then opened and the arc is regenerated, and the welding voltage rises. Then, at the time when the welding voltage exceeds a predetermined value (see, for example, time T2 of FIG. 3), the arc welding apparatus 1 detects the arc state. Upon detecting the arc state, the arc welding apparatus 1 controls the feeding device 15 to change the feeding state of the welding wire 14 from the reverse feed to the forward feed.

Further, upon detecting the arc state, the arc welding apparatus 1 supplies the welding current having the maximum current value to the welding wire 14 for a predetermined period. The arc welding apparatus 1 then gradually reduces the welding current.

In response that the welding wire 14 is forward-fed, the short then occurs and the welding voltage decreases. Then, at the time when that welding voltage falls below the predetermined value (see, for example, time T3 of FIG. 3), the arc welding apparatus 1 detects the short state. Since the operation of the arc welding apparatus 1 after the detection of such the short state is similar to the operation on and after the time T1, the description thereof will be omitted.

In this way, the arc welding apparatus 1 detects the short state and the arc state, and adjusts the forward feed and the reverse feed of the welding wire 14 based on the detected result.

It is noted that, as illustrated in FIG. 3, the short state and the arc state typically occur at a period close to constant. Therefore, the switching between the forward feed and the reverse feed of the welding wire 14 is done at a predetermined period. As a result, the distance between the tip end of the welding wire 14 and the work W (hereafter, referred to as "arc length") is maintained to a proper length. The arc length is maintained to a proper length, so that the arc welding apparatus 1 is able to reduce the spatter to improve the welding quality.

Here, there is a case where the period of the occurrence of the arc state and the short state significantly changes due to the disturbance such as the change in the state of the melting pool or the environment. In particular, when the period of the short state is reduced, if the reverse feed were applied during the short state only as usual, the reverse feed period would also be reduced. Thus, the welding wire 14 would be insufficiently reverse-fed resulting in the reduced arc length. If the operation entered the arc state with the arc length being reduced, the spatter would increase and thus the poor welding quality would be caused.

In contrast, the arc welding apparatus 1 according to the present embodiment is configured to be able to improve the welding quality even when the short state (the short-state period) is reduced while typically applying the forward feed and the reverse feed depending on the arc state and the short state. Specifically, the arc welding apparatus 1 according to the present embodiment continues the reverse feed for a predetermined period even when the arc state is detected. This allows the proper arc length to be maintained, so that the welding quality can be improved. This point will be described in detail by using FIG. 4.

Figure 4:
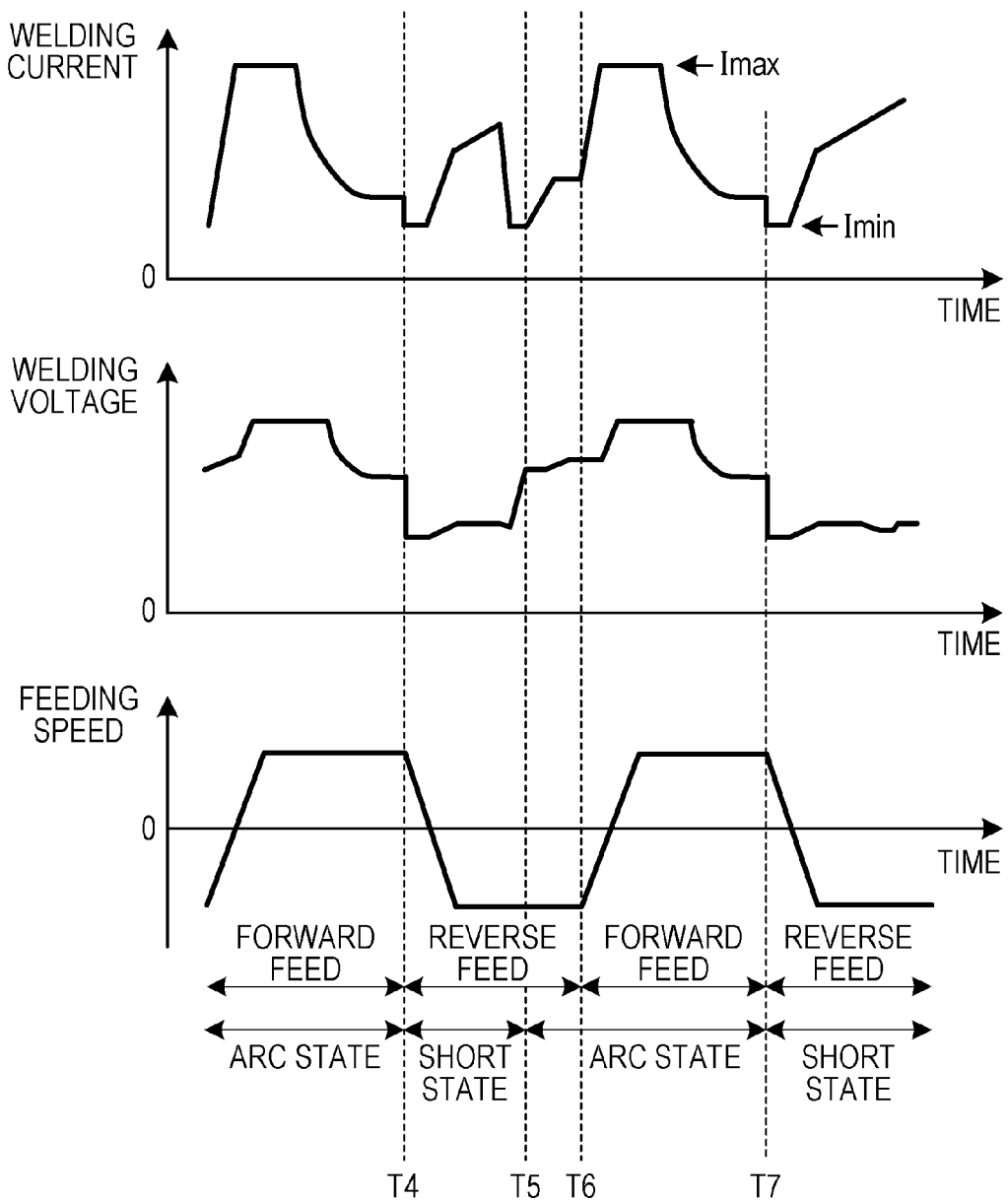
FIG. 4 illustrates graphs representing temporal changes of the welding current, the welding voltage, and the feeding speed according to the first embodiment.

FIG. 4 illustrates graphs representing temporal changes of the welding current, the welding voltage, and the feeding speed of the welding wire 14 according to the present embodiment. The vertical axes of the graphs represent the welding current, the welding voltage, and the feeding speed, respectively. The horizontal axes of the graphs all represent time.

It is assumed that the short state is detected by the arc welding apparatus 1 (the detector 41) at time T4 indicated in FIG. 4. Upon the detection of the short state, the arc welding apparatus 1 (the instructor 44, the feed adjuster 42) controls the feeding device 15 so as to change the feeding state of the welding wire 14 from the forward feed to the reverse feed.

Then, at time T5, the arc state is detected. As this time, it is assumed that the short-state period indicated by the period from the time T4 to the time T5 is shorter than the normal short-state period (for example, the period from the time T1 to the time T2). In this case, the arc welding apparatus 1 according to the present embodiment (the instructor 44) continues the reverse feed of the welding wire 14 for a predetermined period. Specifically, even when detecting the arc state at the time T5, the arc welding apparatus 1 reverse-feeds the welding wire 14 until time T6 at which the predetermined period has elapsed from the detection of the short state.

That is, at the time T6, the arc welding apparatus 1 (the determiner 43) determines that the predetermined period has elapsed from the detection of the short state. Then, the arc welding apparatus 1 (the instructor 44 and the feed adjuster 42) controls the feeding device 15 to change the feeding state of the welding wire 14 from the reverse feed to the forward feed.

Further, while the reverse feed is being applied under the arc state (between the time T5 to the time T6), the arc welding apparatus 1 (the current adjuster 45, the switching circuit 5) reduces the value of the welding current supplied to the welding wire 14 to be smaller than the maximum value Imax of the welding current supplied to the welding wire 14 in the case of the arc state. This allows for the suppression of vibration in the melting pool and thus allows for the stable welding.

It is noted that, in FIG. 4, the value of the welding current during the reverse feed being applied under the arc state (between the time T5 and the time T6) is set to a constant value between the maximum value Imax and the minimum value Imin of the welding current. This value of the welding current is not limited to it, but may be set to substantially the same as the minimum value Imin of the welding current, or may be set so as to increase at a constant increasing rate, for example.

Described below will be the above-described predetermined period (the period from the time T4 to the time T6) that is the reverse feed period in the case where the period of the short state is reduced as illustrated in FIG. 4. For example, this predetermined period is set to be substantially the same as the reverse feed period in the case where the short state and the arc state occur at a period close to constant. For example, in the present embodiment, the predetermined period is set to substantially the same as the period from the time T1 to the time T2 of FIG. 3. It is noted that the setting method of the predetermined period may include, for example, the method of deriving the proper value in advance by the experiment and the like.

Further, the determiner 43 may change the predetermined period depending on the welding current value inputted from the external controller 16. This is because the period at which the short state and the arc state occur changes when the welding current value is changed. Therefore, the predetermined period is changed depending on the welding current value, so that the predetermined period can be the proper value regardless of the welding current value. This allows for the improvement of the welding quality regardless of the welding current value.

Figure 5:
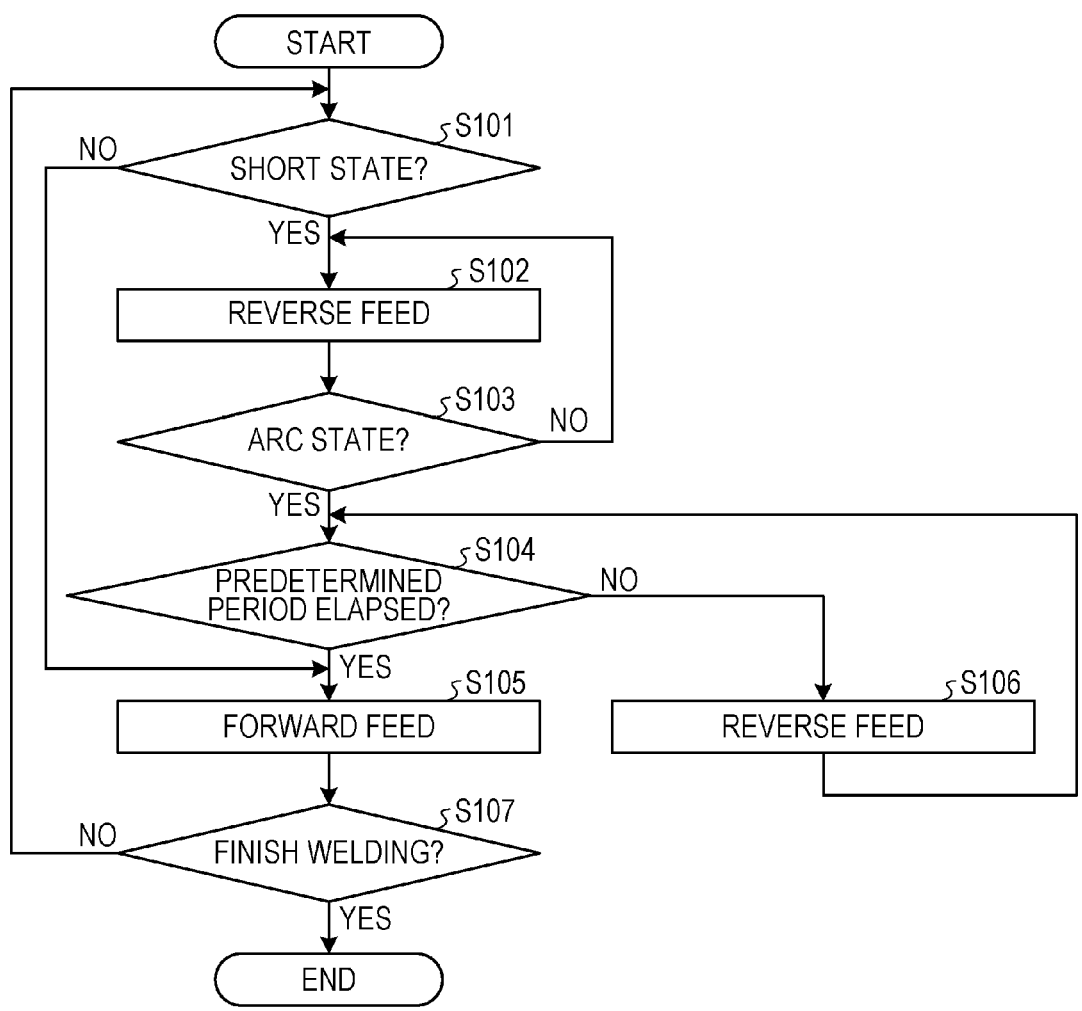
FIG. 5 is a flowchart illustrating a welding process according to the first embodiment.

Next, by referring to FIG. 5 and already illustrated FIG. 1 and FIG. 2, a welding process of the arc welding apparatus 1 according to the present embodiment will be described. FIG. 5 is a flowchart illustrating the welding process according to the present embodiment.

First, the detector 41 detects whether or not it is in the short state between the welding wire 14 and the work W (step S101). Here, if the detector 41 detects the short state (step S101, Yes), the feed adjuster 42 adjusts the feeding state of the welding wire 14 to reverse-feed the welding wire 14 (step S102). On the other hand, if the detector 41 does not detect the short state (step S101, No), step S105 is performed (that is, the welding wire 14 is forward-fed).

After the step S102, the detector 41 detects whether or not it is in the arc state between the welding wire 14 and the work W (step S103). Here, if the detector 41 detects the arc state (step S103, Yes), step S104 is performed. If the detector 41 does not detect the arc state (step S103, No), the process returns to the step S102.

Then, at the step S104, the determiner 43 determines whether or not a predetermined period has elapsed. Here, if the determiner 43 determines that the predetermined period has elapsed (step S104, Yes), the feed adjuster 42 adjusts the feeding state of the welding wire 14 to forward-feed the welding wire 14 (step S105).

On the other hand, if the determiner 43 determines that the predetermined period has not elapsed (step S104, No), the instructor 44 instructs the feed adjuster 42 to continue the reverse feed (step S106), and the process returns to the step S104. Further, at the step S106, the current adjuster 45 reduces the value of the welding current supplied to the welding wire 14 to be smaller than the maximum value Imax of the welding current supplied to the welding wire 14 in the case of the arc state.

Subsequently, the welding controller 4 determines whether or not to finish the welding (step S107). Here, if it is determined to finish the welding (step S107, Yes), the arc welding apparatus 1 finishes the welding of the work W. On the other hand, if it is not determined to finish the welding (step S107, No), the process returns to the step S101 and the welding is continued.

Here, the welding controller 4 may determine whether or not to finish the welding based on the time from the start of the welding or the instruction from the external controller 16, for example. It is noted that, in the welding process of FIG. 5, whether or not to finish the welding is determined when the forward feed is being applied. However, whether or not to finish the welding may be determined when the reverse feed is being applied. Alternatively, the welding controller 4 may accept the welding completion instruction as an interrupt instruction while executing the welding process.

Further, in the welding process of FIG. 5, whether or not it is in the short state between the welding wire 14 and the work W is detected at the step S101. In this step, however, detected may be whether or not it is in the arc state between the welding wire 14 and the work W. Alternatively, in the step S101, the detector 41 may compare the welding voltage with a predetermined value. In this case, the detector 41 may detect (determine) that it is in the short state between the welding wire 14 and the work W if the welding voltage is less than or equal to the predetermined value, or may detect (determine) that it is in the arc state between the welding wire 14 and the work W if the welding voltage is greater than the predetermined value. In this way, the process of the step S101 and the process of the step S103 may be performed together in one step.

Further, in the welding process of FIG. 5, whether or not the predetermined period has elapsed from the detection of the short state is determined after the arc state has been detected. This results in that, even when the determiner 43 determines that the predetermined period has elapsed, the instructor 44 instructs the feed adjuster 42 to continue the reverse feed until the detector 41 detects the arc state.

As having been described above, the arc welding apparatus according to the first embodiment has the detector, the feed adjuster, the determiner, and the instructor. The detector detects whether it is in the short state or the arc state between the consumable electrode (the welding wire 14) and the welded article (the work W).

The feed adjuster adjusts the feeding state of the consumable electrode so as to apply the forward feed for feeding the consumable electrode in the direction to the welded article when the detector detects the arc state and apply the reverse feed for feeding the consumable electrode in the direction opposite to the welded article when the detector detects the short state.

The determiner determines whether or not a predetermined period has elapsed after the detector has detected the short state. Until the determiner determines that the predetermined period has elapsed after the detector has detected the short state, the instructor instructs the feed adjuster to continue the reverse feed even when the detector detects the arc state.

Therefore, according to the arc welding apparatus according to the first embodiment, the reverse feed is continued until at least a predetermined period has elapsed regardless of whether it is in the short state or the arc state between the consumable electrode and the welded article. Therefore, even when the short state is reduced, the spatter can be reduced and thus the welding quality can be improved. That is, the welding quality can be further improved.

(Second Embodiment)

In the second embodiment, an arc welding system 100 will be described. In the arc welding system 100, the arc welding apparatus 1 according to the first embodiment and a robot 20 having the welding torch 13 attached to its tip end are combined. This allows for further improvement of the welding quality in the arc welding system 100.

Figure 6:
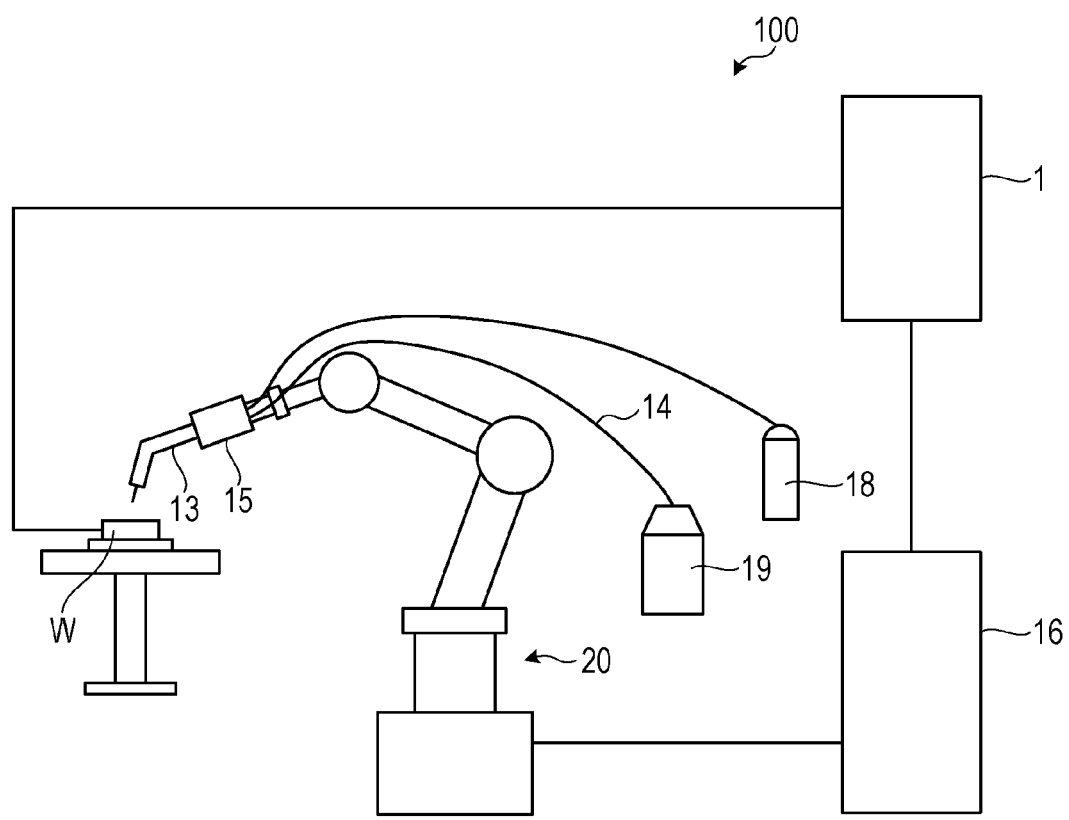
FIG. 6 is a diagram illustrating an arc welding system according to a second embodiment.

FIG. 6 is a diagram illustrating the arc welding system 100 according to the second embodiment. It is noted that, in the second embodiment, the same components as those in the first embodiment are provided with the same reference numerals and the description thereof will be omitted.

The arc welding system 100 has the arc welding apparatus 1 according to the first embodiment and the robot 20. The robot 20 moves the tip end of the welding wire 14 relatively with respect to the work W. The arc welding system 100 further has the welding torch 13, the welding wire 14, the feeding device 15, the external controller 16, a gas cylinder 18, and a welding wire supplier 19.

In the present embodiment, the external controller 16 functions also as a controller of the robot 20. That is, the external controller 16 controls the robot 20 and changes the position and attitude of the welding torch 13. For example, the external controller 16 moves the welding torch 13 so that the tip end of the welding torch 13 traces a desired welding line with respect to the work W.

The welding wire supplier 19 supplies the incorporated welding wire 14 to the feeding device 15. The gas cylinder 18 supplies a shield gas to the welding torch 13.

In the second embodiment, the arc welding apparatus 1 according to the first embodiment is mounted to the arc welding system 100. This allows for further improvement of the welding quality in the arc welding system 100.

Further advantages and modified examples can be readily derived by those skilled in the art. Thus, a broader form of the present disclosure is not limited by the specific details and the exemplary embodiments that have been illustrated and described above. Therefore, various modifications are possible without departing from the spirit and scope of the concept of the extensive disclosure defined by the appended claims and their equivalents.

It is noted that the welding wire 14 is an example of the consumable electrode. The work W is an example of the welded article. The detector 41 is an example of the detection means. The feed adjuster 42 is an example of the feed adjustment means. The determiner 43 is an example of the determination means. The instructor 44 is an example of the instruction means.

Further, the arc welding apparatus, the arc welding method, the arc welding system, and the welded article may be the following first to fourth arc welding apparatus, first to third arc welding methods, first arc welding system, and first welded article. The first arc welding apparatus has: a detector configured to detect whether it is in a short state or an arc state between a consumable electrode and a welded article; a feed adjuster configured to adjust a feeding state of the consumable electrode so as to apply a forward feed for feeding the consumable electrode in a direction to the welded article when the detector detects the arc state and apply a reverse feed for feeding the consumable electrode in a direction opposite to the welded article when the detector detects the short state; a determiner configured to determine whether or not a predetermined period has elapsed after the detector has detected the short state; and an instructor configured to instruct the feed adjuster to continue the reverse feed even when the detector detects the arc state, until the determiner determines that the predetermined period has elapsed after the detector has detected the short state.

In the second arc welding apparatus in the first arc welding apparatus, when the determiner determines that the predetermined period has elapsed, the instructor instructs the feed adjuster to continue the reverse feed until the detector detects the arc state.

In the first or second arc welding apparatus, the third arc welding apparatus has a current adjuster configured to reduce a current value supplied to the consumable electrode to be smaller than the maximum value of a current supplied to the consumable electrode in a case of the arc state until the determiner determines that the predetermined period has elapsed after the detector has detected the arc state.

In the fourth arc welding apparatus in any one of the first to third arc welding apparatus, the determiner changes the predetermined period depending on a welding current.

The first arc welding method includes: a detection step for detecting whether it is in a short state or an arc state between a consumable electrode and a welded article; a feed adjustment step for adjusting a feeding state of the consumable electrode so as to apply a forward feed for feeding the consumable electrode in a direction to the welded article when the detection step detects the arc state and apply a reverse feed for feeding the consumable electrode in a direction opposite to the welded article when the detection step detects the short state; a determination step for determining whether or not a predetermined period has elapsed after the detection step has detected the short state; and an instruction step for instructing the feed adjustment step to continue the reverse feed even when the detection step detects the arc state, until the determination step determines that the predetermined period has elapsed after the detection step has detected the short state.

In the second arc welding method in the first arc welding method, when the determination step determines that the predetermined period has elapsed, the instruction step instructs the feed adjustment step to continue the reverse feed until the detection step detects the arc state.

In the first or second arc welding method, the third arc welding method includes a current adjustment step for reducing a current value supplied to the consumable electrode to be smaller than the maximum value of a current supplied to the consumable electrode in a case of the arc state until the determination step determines that the predetermined period has elapsed after the detection step has detected the arc state.

The first arc welding system has: an arc welding apparatus having a detector configured to detect whether it is in a short state or an arc state between a consumable electrode and a welded article, a feed adjuster configured to adjust a feeding state of the consumable electrode so as to apply a forward feed for feeding the consumable electrode in a direction to the welded article when the detector detects the arc state and apply a reverse feed for feeding the consumable electrode in a direction opposite to the welded article when the detector detects the short state, a determiner configured to determine whether or not a predetermined period has elapsed after the detector has detected the short state, and an instructor configured to instruct the feed adjuster to continue the reverse feed even when the detector detects the arc state, until the determiner determines that the predetermined period has elapsed after the detector has detected the short state; and a robot configured to move a tip end of the consumable electrode with respect to the welded article.

The first welded article is welded by an arc welding method including a detection step for detecting whether it is in a short state or an arc state between a consumable electrode and a welded article, a feed adjustment step for adjusting a feeding state of the consumable electrode so as to apply a forward feed for feeding the consumable electrode in a direction to the welded article when the detection step detects the arc state and apply a reverse feed for feeding the consumable electrode in a direction opposite to the welded article when the detection step detects the short state, a determination step for determining whether or not a predetermined period has elapsed after the detection step has detected the short state, and an instruction step for instructing the feed adjustment step to continue the reverse feed even when the detection step detects the arc state, until the determination step determines that the predetermined period has elapsed after the detection step has detected the short state.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An arc welding apparatus comprising:
    a detector configured to detect whether a short state or an arc state exists between a consumable electrode and a welded article;
    a feed adjuster configured to adjust a feeding state of the consumable electrode so as to apply a forward feed for feeding the consumable electrode in a direction to the welded article when the detector detects the arc state and apply a reverse feed for feeding the consumable electrode in a direction opposite to the welded article when the detector detects the short state;
    a determiner configured to determine whether or not a predetermined period has elapsed after the detector has detected the short state; and
    an instructor configured to:
        instruct the feed adjuster to continue the reverse feed even when the detector detects the arc state, until the determiner determines that the predetermined period has elapsed after the detector has detected the short state, the predetermined period being initiated when the detector has detected the short state and before a determination to finish welding is made, and
        instruct the feed adjuster to stop the reverse feed and resume the forward feed when the determiner determines that the predetermined period has elapsed and the detector detects the arc state.

2. The arc welding apparatus according to claim 1, wherein, when the determiner determines that the predetermined period has elapsed, the instructor instructs the feed adjuster to continue the reverse feed until the detector detects the arc state.

3. The arc welding apparatus according to claim 1 further comprising a current adjuster configured to reduce a current value supplied to the consumable electrode to be smaller than a maximum value of a current supplied to the consumable electrode in a case of the arc state, after the detector has detected the arc state, until the determiner determines that the predetermined period has elapsed after the short state has been detected.

4. The arc welding apparatus according to claim 2 further comprising a current adjuster configured to reduce a current value supplied to the consumable electrode to be smaller than a maximum value of a current supplied to the consumable electrode in a case of the arc state, after the detector has detected the arc state, until the determiner determines that the predetermined period has elapsed after the short state has been detected.

5. The arc welding apparatus according to claim 1, wherein the determiner changes the predetermined period depending on a welding current.

6. The arc welding apparatus according to claim 2, wherein the determiner changes the predetermined period depending on a welding current.

7. The arc welding apparatus according to claim 3, wherein the determiner changes the predetermined period depending on a welding current.

8. The arc welding apparatus according to claim 4, wherein the determiner changes the predetermined period depending on a welding current.

9. The arc welding apparatus according to claim 1 wherein the arc welding apparatus is configured to apply a current value that is between a minimum current value and a maximum current value of a current supplied to the consumable electrode, after the detector has detected the arc state and the forward feed has resumed.

10. The arc welding apparatus according to claim 1, wherein when the detector detects the arc state during the reverse feed and before the predetermined period has elapsed, the instructor instructs the feed adjuster to resume the forward feed at a termination time of the predetermined period.

11. The arc welding apparatus according to claim 1, wherein, when the determiner determines that the predetermined period has elapsed without the detection of the arc state, the instructor instructs the feed adjuster to continue the reverse feed until the detector detects the arc state.

12. The arc welding apparatus according to claim 1, wherein the predetermined period is initiated before the determination to finish welding is made, the determination being based on a time from the start of the welding or an instruction received from the arc welding apparatus.

13. The arc welding apparatus according to claim 1, wherein the instructor is configured to initiate the predetermined period more than once before the determination to finish welding is made.

14. An arc welding method including:
    detecting whether a short state or an arc state exists between a consumable electrode and a welded article;
    adjusting a feeding state of the consumable electrode so as to apply a forward feed for feeding the consumable electrode in a direction to the welded article when the arc state is detected and apply a reverse feed for feeding the consumable electrode in a direction opposite to the welded article when the short state is detected;
    determining whether or not a predetermined period has elapsed after the short state has been detected, the predetermined period being initiated when the short state is detected and before a determination to finish welding is made;
    until it is determined that the predetermined period has elapsed after the short state has been detected, continuing the reverse feed even when the arc state has been detected; and
    stopping the reverse feed and resuming the forward feed when it is determined that the predetermined period has elapsed and the arc state has been detected.

15. The arc welding method according to claim 14 further including continuing the reverse feed until the arc state is detected even when it is determined that the predetermined period has elapsed.

16. The arc welding method according to claim 14 further including, after the arc state has been detected, until it is determined that the predetermined period has elapsed after the arc state has been detected, reducing a current value supplied to the consumable electrode to be smaller than a maximum value of a current supplied to the consumable electrode in a case of the arc state.

17. The arc welding method according to claim 15 further including, after the arc state has been detected, until it is determined that the predetermined period has elapsed after the arc state has been detected, reducing a current value supplied to the consumable electrode to be smaller than a maximum value of a current supplied to the consumable electrode in a case of the arc state.

18. The arc welding method according to claim 14 further including changing the predetermined period depending on a welding current.

19. The arc welding method according to claim 15 further including changing the predetermined period depending on a welding current.

20. The arc welding method according to claim 16 further including changing the predetermined period depending on a welding current.

21. The arc welding method according to claim 17 further including changing the predetermined period depending on a welding current.

22. A welded article welded by the arc welding method according to claim 14.

23. The arc welding method according to claim 14 further including, after the arc state has been detected and while the forward feed has been resumed, applying a current value that is between a minimum current value and a maximum current value of a current supplied to the consumable electrode.

24. An arc welding system comprising:
the arc welding apparatus according to claim 1; and
a robot configured to move a tip end of the consumable electrode with respect to the welded article.

25. An arc welding apparatus comprising:
a detection means for detecting whether a short state or an arc state exists between a consumable electrode and a welded article;
a feed adjustment means for adjusting a feeding state of the consumable electrode so as to apply a forward feed for feeding the consumable electrode in a direction to the welded article when the detection means detects the arc state and apply a reverse feed for feeding the consumable electrode in a direction opposite to the welded article when the detection means detects the short state;
a determination means for determining whether or not a predetermined period has elapsed after the detection means has detected the short state; and
an instruction means for:
instructing the feed adjustment means to continue the reverse feed even when the detection means detects the arc state, until the determination means determines that the predetermined period has elapsed after the detection means has detected the short state, the predetermined period being initiated when the detection means has detected the short state and before a determination to finish welding is made, and
instructing the feed adjustment means to stop the reverse feed and resume the forward feed when the determination means determines that the predetermined period has elapsed and the detection means detects the arc state.

26. The arc welding apparatus according to claim 25 wherein the arc welding apparatus is configured to apply a current value that is between a minimum current value and a maximum current value of a current supplied to the consumable electrode, after the detection means has detected the arc state and the forward feed has resumed.

* * * * *